D. H. WILSON.
TELEPHONE REPEATING DEVICE.
APPLICATION FILED APR. 11, 1913.
1,128,927.
Patented Feb. 16, 1915.
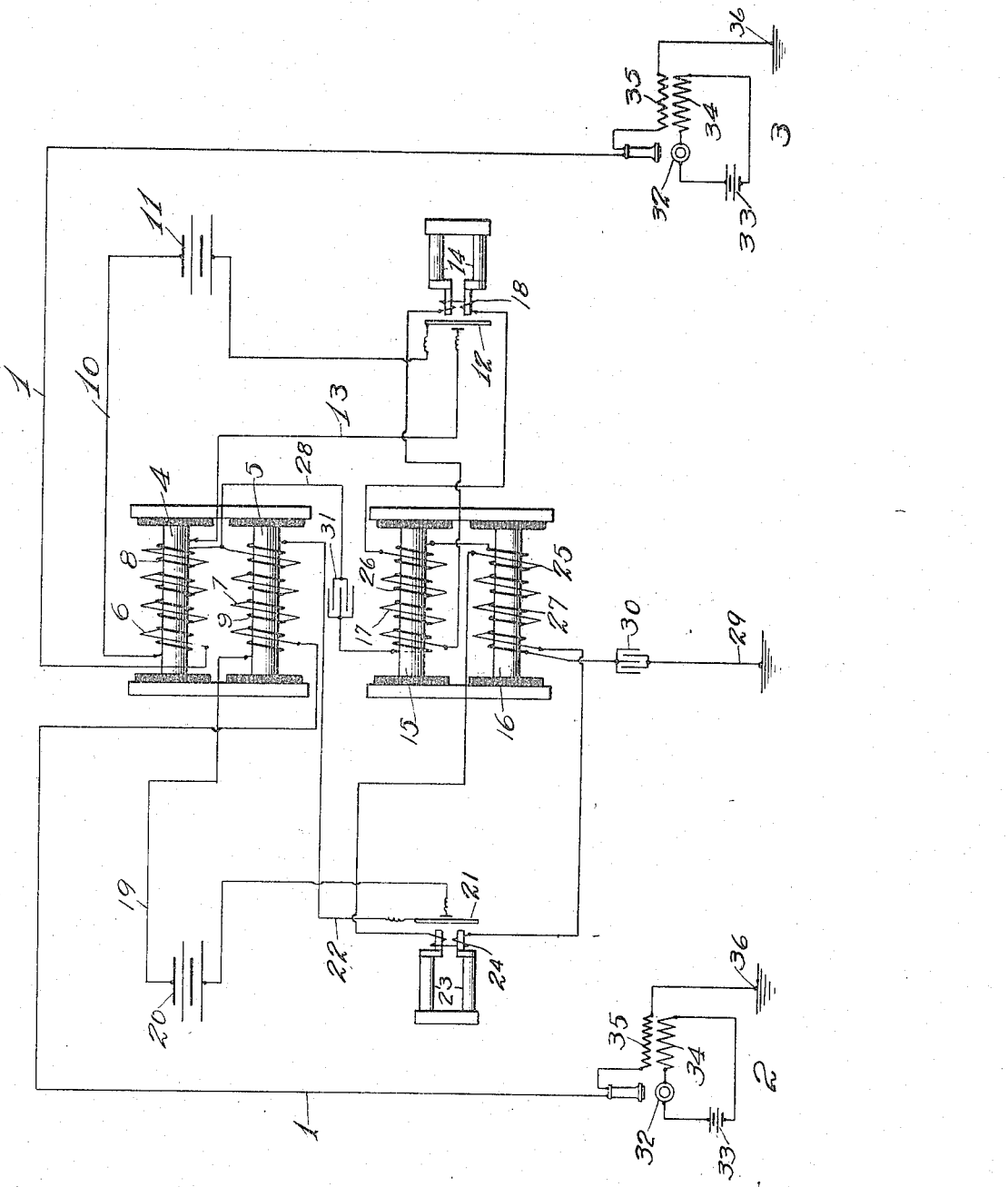
Witnesses:
O. L. Plumtree
Denie O. Walters
Inventor:
David H. Wilson.
by Parker & Carter
his Attys.

UNITED STATES PATENT OFFICE.

DAVID H. WILSON, OF NEW YORK, N. Y.

TELEPHONE REPEATING DEVICE.

1,128,927.     Specification of Letters Patent.     Patented Feb. 16, 1915.

Application filed April 11, 1913. Serial No. 760,465.

*To all whom it may concern:*

Be it known that I, DAVID H. WILSON, a citizen of the United States, residing at New York, in the county of New York and State of New York, have invented a certain new and useful Improvement in Telephone Repeating Devices, of which the following is a specification.

This invention relates to telephone repeaters and has for its object to provide a new and improved device of this description.

The invention is illustrated in the accompanying drawings wherein I have shown diagrammatically one form of repeating device suitably connected in circuit.

Referring now to the drawing, I have shown a main line 1 connected in circuit with the telephone stations 2 and 3. Intermediate these stations may be placed one or more of the repeating instruments. For purpose of illustration, I have shown one of the repeating devices. This device consists of an induction coil, preferably a duplex induction coil, having the cores 4 and 5 connected together by suitable pole pieces. Wound upon these cores are the secondary coils 6 and 7 which are connected with the main line 1. These cores are also provided with primary coils 8 and 9. The primary coil 8 is connected by a conductor 10 with a source of electric supply 11 which in turn is connected with one terminal of the transmitter 12, the other terminal being connected by a conductor 13 with the coil 8. The diaphragm of the transmitter 12 is actuated by the pole pieces of the permanent magnet 14. Associated with the induction coil is an amplifier having cores 15 and 16. One of these cores, as for example, the core 15 is provided with a coil 17 which is connected in circuit with a coil 18, associated with the permanent magnet 14.

The primary coil 9 of the induction coil is connected by conductor 19 with a source of electric supply 20 which in turn is connected to one terminal of the transmitter 21, the other terminal of said transmitter being connected by conductor 22 with the primary coil 9. The transmitter 21 is arranged so that the diaphragm thereof will be actuated by the permanent magnet 23. A coil 24 is associated with this permanent magnet and is connected in circuit with a coil 25 on the core 16 of the amplifier. The core 15 of the amplifier is provided with a coil 26 and the core 16 with a coil 27, the two coils being connected in series and being connected in the main line, said latter connection being made by the conductor 28 and being intermediate the secondary coils 6 and 7 of the transformer. These coils 26 and 27 are connected to the ground by the conductor 29 through a suitable condenser or bridge 30. I also prefer to provide a condenser 31 in the conductor 28 between the coil 26 and the coils 6 and 7.

The stations 2 and 3 may be provided with any suitable form of telephone instruments. I have illustrated these stations as provided with a transmitter 32, a source of electric supply 33 connected in circuit therewith and a primary coil 34 of an induction coil connected in circuit therewith. The main line 1 is provided at each station with a secondary coil 35, said main line being grounded at 36.

The use and operation of my invention are as follows: If for example some one talks into the transmitter at station 3, a talking current is set up in the main line 1. This talking current then passes through the secondary coils 6, 6, of the transformer and then passes on to the station 2. A portion of this current divides and passes through conductor 28 and then through the primary coils 26 and 27 of the amplifier, and thence to ground. This sets up an induced talking current in the secondary coils 17 and 25 of the amplifier which talking current passes through coils 18 and 24 associated with the permanent magnets 14 and 23. This current causes the diaphragms of the transmitters 12 and 21 to be operated thereby producing a similar talking current in the primary coils 8 and 9 of the induction coil, said talking current being greatly increased by the sources of electric supply 11 and 20. The coils 8 and 9 then induce a talking current in the secondary coils 6 and 7 thereby strengthening the talking current in said coils which enlarged and augmented talking current is transmitted to the station 2. When the person at station 2 talks, the action will be the same except in the reversed direction. It will thus be seen that I have here a simple repeating device which may be located at any desired point and which increases and reinforces the talking current as it passes from one station to another. It will further be seen that this repeater is used upon a grounded circuit thereby permitting long distance telephoning through great distances by means of grounded circuit.

I claim:

1. A telephone repeating device comprising a main line grounded circuit, a main line coil in said circuit, a core for said coil, a multiple coil in multiple with said main line circuit, a core for said multiple coil, a local circuit coil on the core of the main line circuit coil, a source of electric supply and a transmitter in circuit with said local circuit coil, a coil on the core of said multiple circuit coil, a second coil in circuit therewith, said second coil provided with a core for actuating the diaphragm of said transmitter.

2. A telephone repeating device comprising a main line grounded circuit, a main line coil in said circuit, a core for said coil, a multiple coil in multiple with said main line circuit, said coil connected to ground and a condenser between said coil and the main line circuit and between said coil and the ground, a core for said multiple coil, a local circuit coil on the core of the main line circuit coil, a source of electric supply and a transmitter in circuit with said local circuit coil, a coil on the core of said multiple circuit coil, a second coil in circuit therewith, said second coil provided with a core for actuating the diaphragm of said transmitter.

3. A telephone repeating device, comprising a main line circuit, a main line coil therein, a core for said coil, a multiple coil connected in multiple with the main line, said multiple coil connected to the ground, a core for said multiple coil, a local circuit coil on the core of the main line coil, a source of electric supply and a transmitter in circuit with said local circuit coil, a coil on the core of said multiple coil, a second coil in circuit therewith and a core for said second coil, said core actuating the receiver of said transmitter.

4. A telephone repeating device comprising a grounded main line circuit, an induction coil associated therewith having a primary and a secondary coil, the secondary coil being in the main line circuit, a local circuit containing a source of electric supply and a transmitter connected with said primary circuit, a primary coil connected in multiple with the main line and connected to the ground, a core therefor, a secondary coil on said core, a local circuit with which said secondary coil is connected, a coil in said local circuit, and a core about which said coil is wound, said core actuating the diaphragm of said transmitter.

In testimony whereof, I affix my signature in the presence of witnesses this 10th day of April 1913.

DAVID H. WILSON.

Witnesses:
F. W. SEYBOLT,
JOHN R. DAVIDSON,
CORA M. WILSON.